R. L. BERNARD.
FLYING MACHINE.
APPLICATION FILED NOV. 10, 1911.
1,034,958.
Patented Aug. 6, 1912.
2 SHEETS—SHEET 1.
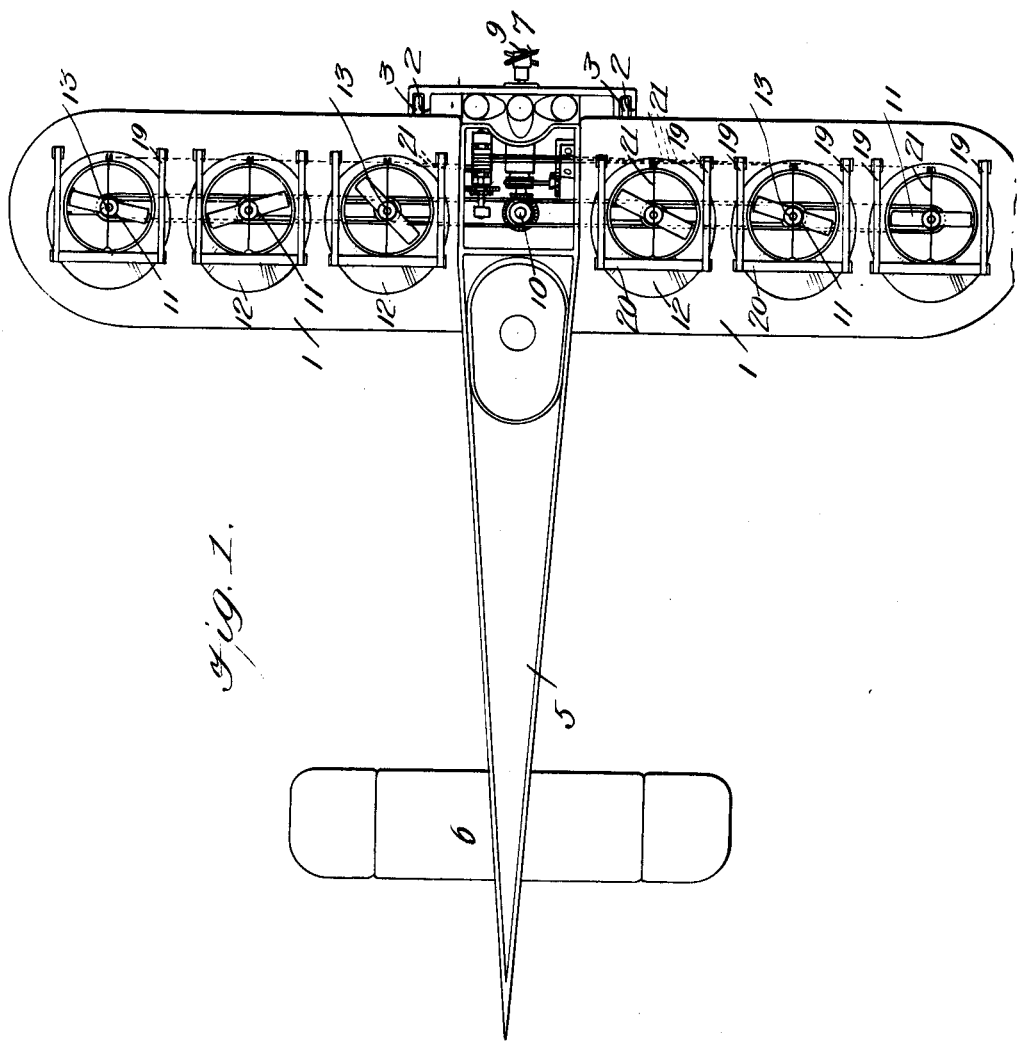
WITNESSES
INVENTOR
Reuben Leroy Bernard
BY
ATTORNEYS R. L. BERNARD.
FLYING MACHINE.
APPLICATION FILED NOV. 10, 1911.
1,034,958.
Patented Aug. 6, 1912.
2 SHEETS—SHEET 2.
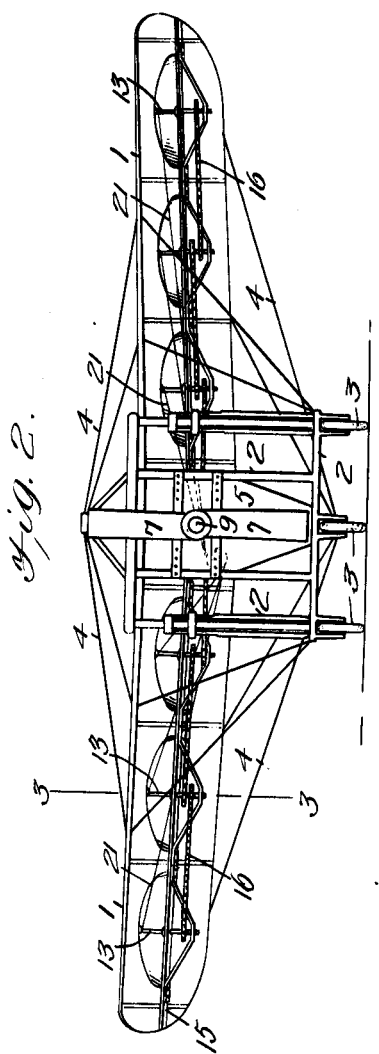
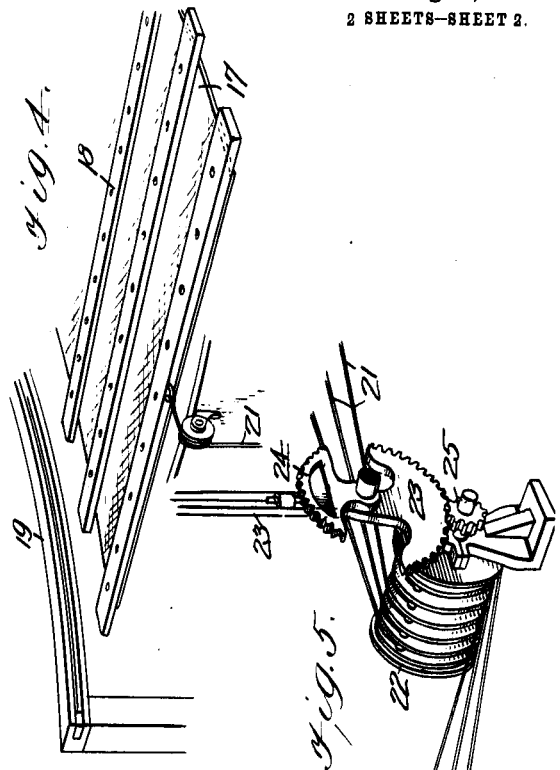
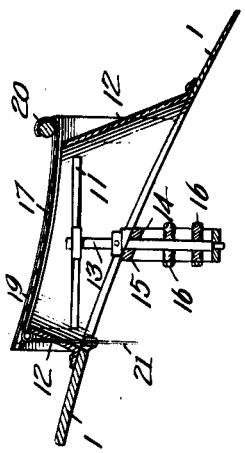
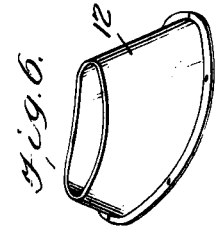
WITNESSES
INVENTOR
Reuben Leroy Bernard
BY
ATTORNEYS

UNITED STATES PATENT OFFICE.

REUBEN LEROY BERNARD, OF MOUNTAIN VIEW, CALIFORNIA.

FLYING-MACHINE.

1,034,958. Specification of Letters Patent. Patented Aug. 6, 1912.

Application filed November 10, 1911. Serial No. 659,633.

*To all whom it may concern:*

Be it known that I, REUBEN LEROY BERNARD, a citizen of the United States, and a resident of Mountain View, in the county of Santa Clara and State of California, have invented an Improvement in Flying-Machines, of which the following is a specification.

My invention combines the main features of an aeroplane and a helicopter, whereby certain advantages are attained in respect to starting and alighting, direction of flight, poising, maintenance of equilibrium, regulation of speed, and general safety.

The details of construction, arrangement, and operation of parts are as hereinafter described, and illustrated in the accompanying drawings, in which—

Figure 1 is a plan view of my improved machine. Fig. 2 is a front elevation. Fig. 3 is an enlarged section on the line 3—3 of Fig. 2. Fig. 4 is a perspective view illustrating the curtains or sheet guards for the horizontal propellers constituting the helicopter proper. Fig. 5 is a perspective view illustrating a means for controlling the curtains or sheet guards for the horizontal propellers. Fig. 6 is a perspective view of one of the conical frustums or casings for the horizontal or lifting propellers.

In Figs. 1 and 2, the monoplane 1 is shown attached to, and supported upon, a central framework 2, which is provided with running wheels 3, and the monoplane is braced by wires 4 substantially in the usual way. A tail 5 extends rearwardly and is provided with a horizontal rudder 6 which may be manipulated in the usual or well known manner.

A screw propeller 7 is arranged in front of the aeroplane, and a motor is located directly in rear of the same and upon the propeller shaft 9. The rear end of this shaft is geared, as shown in Fig. 1, with a small drum or pulley 10 which serves as the driving medium for the several horizontal screw-propellers 11. These are arranged in hollow conical frustums 12, and above the aeroplane proper 1.

The vertical shafts 13 of the several propellers 11 are supported in brackets constituting vertical bearings 14, the same being attached to the distending or brace frame 15 of the aeroplane proper. Such frame consists of a longitudinal bar and a series of cross bars, as shown in Fig. 2, the same being arranged directly under and in contact with the aeroplane proper. The latter is provided with a series of openings and the propellers 11 are located directly above these, the shafts 13 occupying the center of the same. Such openings coincide with the bottom portions of the frustums 12, as will be understood by reference to Fig. 3.

The several propellers 11 are driven from the drum 10 on the motor shaft by means of round belt-gearing or sprocket-gearing 16, as may be preferred. In other words, each propeller shaft 13 is provided with one or more belt-pulleys or chain gears and belts or chains run therefrom to adjacent propeller shafts. Thus all the propellers 11 may be driven simultaneously with the front or first propeller 7, in which case the machine will be lifted vertically and driven forward at the same time. In practice, however, a clutch is applied to the motor shaft 9 by which the drum which drives the horizontal propellers 11 may be engaged with, or disengaged from, the shaft, thus placing it within the power of the operator to drive the horizontal and vertical propellers simultaneously, or either alone, as may be required.

When the motor is shut off, it is desirable to close the openings of the frustums 12, and for this purpose I employ canvas covers or curtains 17. The same are formed of stout canvas or other duly flexible and strong material which is provided with lateral battens 18, as shown in Figs. 3 and 4. In other words, the battens, which consist of lath or other thin and narrow wooden strips, serve to strengthen the body 17 and hold it duly flat. The ends of the battens project beyond the canvas, as shown in Fig. 4, and enter grooves in the adjacent framework 19.

The covers or curtains 17 are attached to rollers 20, which are, in practice, provided with strong springs whose normal action tends to wind the curtains on the rollers. Cords 21 are attached to the front or free edges of the curtains 17 and pass over pulleys and are conducted to a grooved drum 22, which is arranged centrally in the framework 2, and whose rotation is controlled by a segmental hand lever 23 provided with a locking segment and pawl 24.

As shown in Fig. 5, the toothed head of the segmental lever 23 engages a pinion 25 keyed on the shaft of the drum 22. It is apparent that, by shifting the lever 23 in either direction, the drum 22 will be rotated either for winding on or unwinding the cords 21, and that the curtains 17 will be correspondingly extended over the tops of the frustums 12, as shown in Fig. 3, or released and wound automatically on their rollers 20. In other words, the aviator, through the medium of any suitable mechanism, may draw out or release the curtains 17, as required in the operation of the machine.

I preferably employ six horizontal propellers, although of course the number may be varied at will.

It is to be understood that the curtains or covers 17 will ordinarily require to be drawn out, as shown in Fig. 3, only in case of stopping of the motor. The lifting or horizontal propellers will, of course, not be required when the aeroplane is running at thirty miles an hour, but when run slowly, they may be used to aid in balancing the aeroplane. The center of gravity is, however, located quite low so that the balance of the aeroplane is easily maintained. It is to be noted that the slanting sides of the frustums offer comparatively little resistance to the flight of the machine.

While I have described the invention as applied to a monoplane, it is to be understood that it is also applicable to biplanes, and the claims hereinafter made are to be interpreted in this light.

What I claim is:—

1. The combination with a monoplane having a series of openings, and horizontal propellers arranged above the same, of hollow frustums in which the propellers are arranged, curtains applied to the top portions of the frustums, and means for drawing out and winding up the curtains, substantially as described.

2. The combination with a monoplane having a series of openings and horizontal propellers arranged above the same, of a framework applied around the propellers and curtains arranged therein and adapted to be drawn out or retracted, cords attached to the free ends of the curtains, and mechanism in the central portion of the machine under the control of the operator for winding on or releasing such cords, substantially as described.

3. The combination with a monoplane proper having a series of openings and horizontal propellers arranged above the same, of a framework inclosing the sides of the propellers and provided with parallel portions having lateral grooves, curtains provided with battens whose projecting ends are adapted to run in said grooves, and means for extending and retracting the curtains, substantially as described.

REUBEN LEROY BERNARD.

Witnesses:
E. W. LILSBEE,
W. McBAIN.